March 9, 1926.

V. I. PEARSON 1,576,489

CLUTCH PEDAL DETENT FOR TRACTORS

Filed June 9, 1925

Inventor

V. I. Pearson

Attorney

Patented Mar. 9, 1926.

1,576,489

UNITED STATES PATENT OFFICE.

VICTOR I. PEARSON, OF HECLA, SOUTH DAKOTA, ASSIGNOR OF ONE-HALF TO HARRY E. BENGTSSON, OF HECLA, SOUTH DAKOTA.

CLUTCH-PEDAL DETENT FOR TRACTORS.

Application filed June 9, 1925. Serial No. 36,066.

*To all whom it may concern:*

Be it known that I, VICTOR I. PEARSON, a citizen of the United States of America, residing at Hecla, in the county of Brown and State of South Dakota, have invented new and useful Improvements in Clutch-Pedal Detents for Tractors, of which the following is a specification.

In using tractors, especially of the Fordson type, for operating a shredder, grinder or similar machinery, two operators are required to attain the proper results. For instance, one in attendance is necessary to occupy the seat on the tractor with foot pressure on the clutch pedal to hold it out of gear while the other attendant is required to look after the operation of the machinery, such as a shredder or grinder, and especially to throw the belt in case something wrong occurs with the shredder or grinder.

Therefore, it is a purpose of the present invention to provide an improved clutch detent for holding the clutch release pedal in a position whereby the clutch is held out of gear, thereby necessitating only one operator or one attendant in using the tractor for furnishing power to a shredder, grinder or similar machine. Whenever the shredder or grinder is uncoupled from its source of power, the detent may be actuated to allow the clutch pedal to be restored to an active position for moving the clutch gears.

The invention comprises further features and combinations of parts to be hereinafter set forth, shown in the drawings and claimed.

Figure 1:
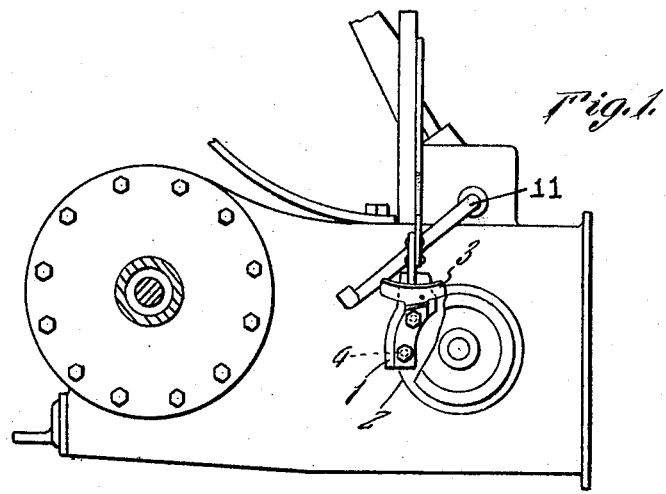
Figure 1 is a view in side elevation of a portion of a tractor of the Fordson type, showing the same equipped with the improved detent for the clutch release pedal.
Figure 2:
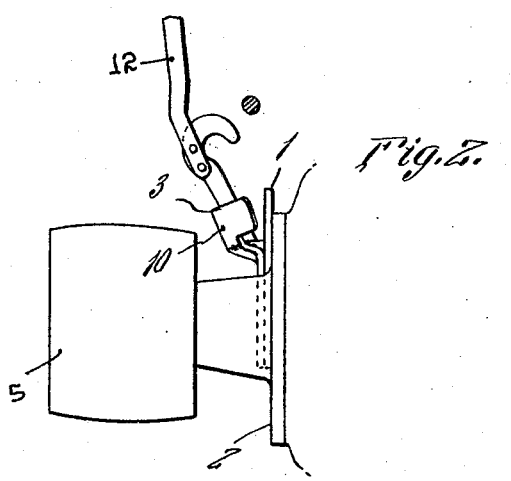
Figure 2 is a front elevational view showing the tractor pulley, the clutch lever in section, and the position of the detent with relation to the clutch lever and the pulley.
Figure 3:
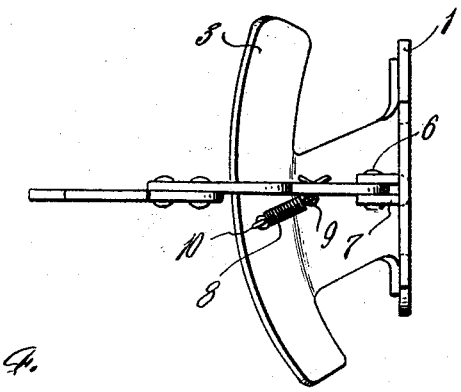
Figure 3 is a top plan view of the invention.
Figure 4:
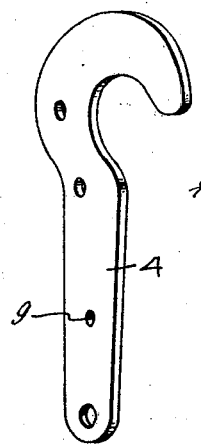
Figure 4 is a detail view showing the detent hook in elevation.

The bracket 1 which supports the detent is secured to the bearing plate 2 of the pulley shaft and by the same bolts which secure said bearing plate to the tractor. Carried by and formed as an integral part of the bracket plate is a belt guard 3 disposed at an incline with reference to the bearing plate and formed to an arcuate contour to shield the detent 4 from the belt traversing the pulley 5.

The detent is in the form of a hook and is pivotally mounted on the pivot stud 6 spanning the ears 7. It is normally impelled in a direction away from the clutch lever by a tension spring 8 terminally connected, as at 9 and 10, between it and the guard 3 but may be engaged with the clutch lever 11 after depression of the latter by moving it inward against the tension of the spring 8 through the medium of the handle 12. When engaged with the clutch lever, the latter is positively held in depressed position and the clutch thereof maintained in inoperative position when the traction motor is free to function as a driving means for the pulley 5 only, so that the latter may be employed for the propulsion of stationary machines.

The invention having been described, what is claimed as new and useful is:

A clutch detent comprising a pivotally mounted hook, a bracket for supporting the same on a tractor in proximity to the driving pulley, and a spring tensioned between the detent hook and the bracket and tending to propel the hook in a direction away from the clutch lever, the bracket being provided with a belt guard in shielding relation to the detent.

In testimony whereof he affixes his signature.

VICTOR I. PEARSON.